April 10, 1928.  1,665,778
A. E. FREDRICKSON
COMBINATION ROASTER AND MIXER
Filed Aug. 6, 1926    2 Sheets-Sheet 1
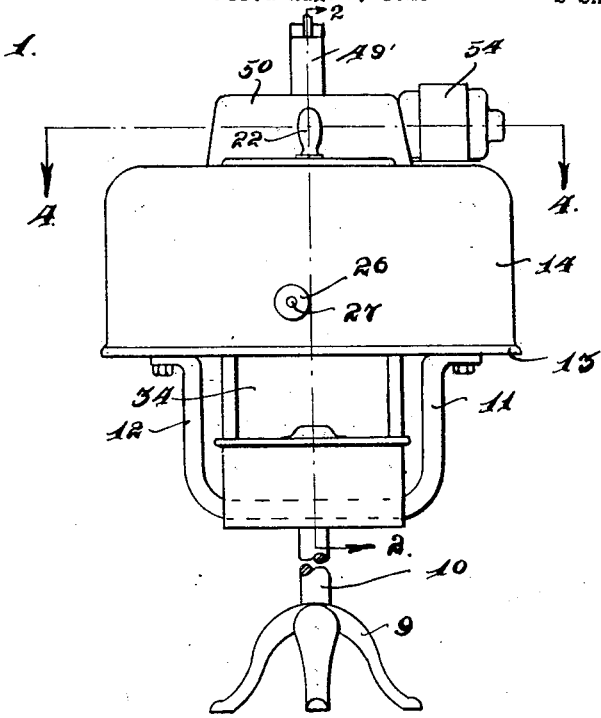
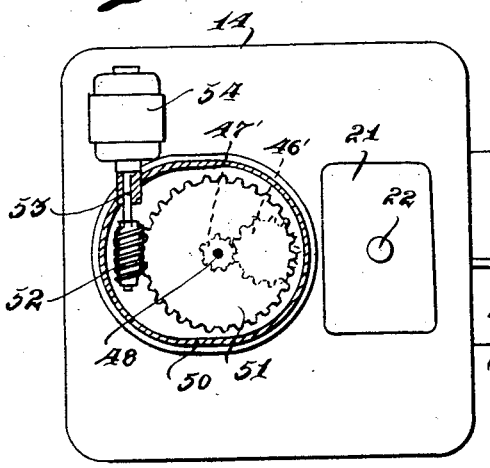
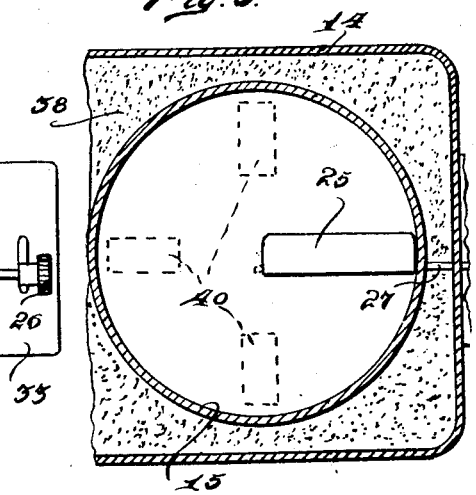
INVENTOR.
Axel E. Fredrickson.
BY
ATTORNEY.

April 10, 1928.  1,665,778
A. E. FREDRICKSON
COMBINATION ROASTER AND MIXER
Filed Aug. 6, 1926  2 Sheets-Sheet 2
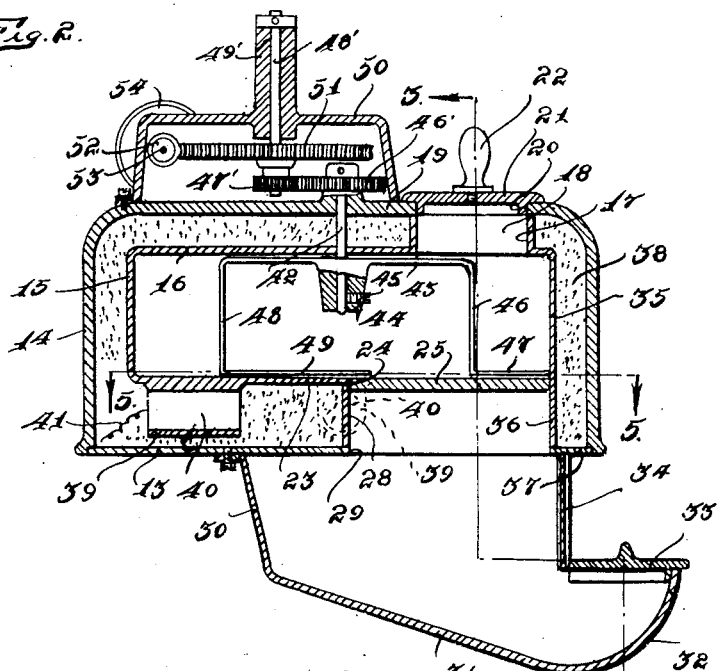
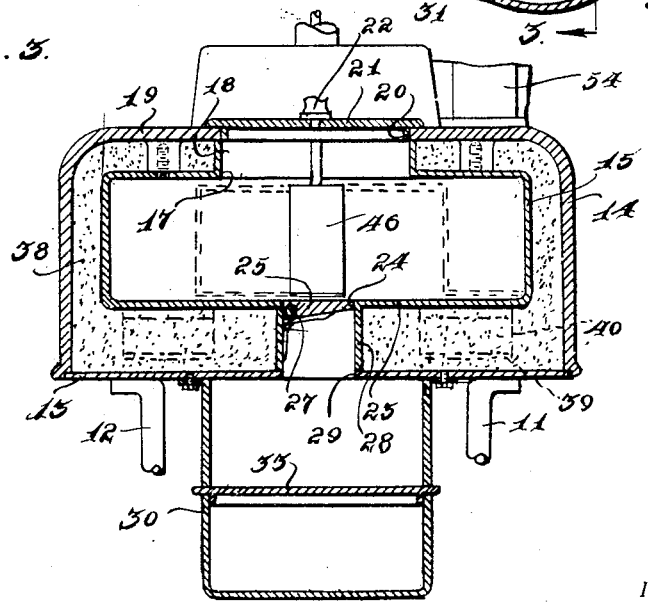
INVENTOR.
Axel E. Fredrickson
BY
Thos. Donnelly
ATTORNEY.

Patented Apr. 10, 1928.

1,665,778

UNITED STATES PATENT OFFICE.

AXEL E. FREDRICKSON, OF FERNDALE, MICHIGAN.

COMBINATION ROASTER AND MIXER.

Application filed August 6, 1926. Serial No. 127,523.

My invention relates to a new and useful improvement in a combination roaster and mixer adapted particularly for roasting peanuts.

The invention has for its object the provision of a combination roaster of this kind provided with a hopper from which the peanuts may be dispensed when sold, the hopper being heated by the same medium used for heating the oven or container in which the peanuts are positioned until the roasting process.

Another object of the invention is the provision of a roaster of this class having a roasting oven or container provided with a mixer for reagitating the peanuts during the roasting process.

Another object of the invention is the provision of a roaster of this class which will be simple in structure, economical of manufacture and highly efficient in use.

Another object of the invention is the provision of a roaster of this class which will be so constructed as to require the minimum amount of heat in the roasting operation and compact so as to occupy the minimum amount of space.

Other objects will appear hereinafter.

The invention consists in the combination and arrangement of parts hereinafter described and claimed.

The invention will be best understood by a reference to the accompanying drawings which form a part of this specification and in which, Fig. 1 is a side elevational view of the invention.

Fig. 2 is a sectional view taken on substantially line 2—2 of Fig. 1.

Fig. 3 is a sectional view with parts broken away taken on substantially line 3—3 of Fig. 2.

Fig. 4 is a sectional view taken on substantially line 4—4 of Fig. 1.

Fig. 5 is a fragmentary sectional view taken on substantially line 5—5 of Fig. 2.

As shown in the drawings there is provided a tripod 9 projecting upwardly from which is a supporting stem 10 provided with a yoke, the legs 11 and 12 of which are secured to the base 13 of a housing 14. Positioned within the housing 14 is an oven or roasting container 15 having in its upper wall 16 an opening 17. Projecting upwardly around the opening 17 is a flange 18 which engages the top wall 19 of the casing, which is also provided with an opening 20 in registration with the opening 17. A removable cover 21 provided with a handle 22 is used as a closure for the opening 20. Formed in the base 23 of the oven is an opening 24 for which there is provided a closure 25 swingably mounted and operable by the hand wheel 26 which is mounted on the shaft 27, so that the closure 25 may be opened at will. Projecting upwardly from the base 13 are side walls or flanges 28 which serve as a chute for conducting material from the oven through the opening 24 and through the opening 29 formed in the base to a hopper 30 which is mounted on the base. This hopper having a forwardly inclined bottom wall portion 31 terminating in a neck 32 which is open at the top and provided with a closure 33, the front wall 34 of this hopper being preferably formed of transparent material. The wall 35 of the oven is provided with an extended portion 36 having the angularly turned portion 37. As clearly appears from Figs. 2, 3 and 5 the oven 15 is spaced from the casing 14 and the space thus provided is packed with asbestos 38 or other material nonconducting as to heat. Formed on the bottom wall of the oven are a plurality of sleeves or tubular supports 39 in which may be positioned a heating element 40 suitably connected by means of the wire 41 to a source of electrical energy.

Projecting into the oven 15 is a shaft 42. Positioned in the oven is an agitator or mixer comprising a bar 43 having a boss 44 projecting downwardly from its undersurface, the shaft 42 engaging in a bore formed in said boss and secured therein by means of the set screw 45 so that a rotation of the shaft 42 will effect a rotation in the oven 15 of the bar 43. This bar 43 has a downwardly extending portion 46 which at its end is provided with the angularly turned portion 47. Projecting downwardly from the opposite end of the bar 43 is a leg 48 which is connected to a horizontally extending plate or bar 49 positioned in close proximity to the bottom of the oven 15. The portions 47 and 49 serve as agitators as do likewise the downwardly projecting portions 46 and 48 so that when the shaft 42 is rotated the peanuts or other articles placed in the oven 15 will be constantly agitated so as to prevent burning etc. Fixedly mounted on the shaft 42 exteriorly of the housing 14 is a gear 46′ which meshes with a pinion 47′ fixedly mounted upon a shaft 48' which is journalled in an upwardly projecting guide sleeve 49' extending from the top 50 of a housing. Fixedly mounted upon the shaft 48 is a worm wheel 51 meshing with a worm 52 which is fixedly mounted upon the shaft 53 of the electric motor 54.

In use the cover 21 may be removed and the peanuts or other articles to be roasted deposited in the oven 15 and the heating elements 40 energized to heat the oven. The motor 54 may then be set into operation so as to rotate the agitating member in the oven 15 to keep the peanuts or other articles stirred so as to prevent burning etc. When the roasting process is finished the contents may be deposited through the opening 24 into the hopper 30, from which they may be removed as desired by removing the cover 33.

It is thus seen that the structure is one which affords a device for roasting peanuts and also provides a dispensing hopper from which the peanuts may be sold. The heating elements 40 will serve to retain the peanuts in the hopper warm so that they are always retained hot, the advantage of which is obvious.

The structure of the device is believed to be quite simple and one which, while serving the double purposes mentioned, is compact so as to occupy but little space.

While I have illustrated and described the preferred form of my invention, I do not wish to limit myself to the precise form of structure shown, but desire to avail myself of such variations and modifications as come within the scope of the appended claims.

Having thus described my invention what I claim as new and desire to secure by Letters Patent is:

1. A machine of the class described comprising an oven; an agitator comprising a horizontally disposed member having a downwardly projected and horizontally outwardly turned leg at one end; a downwardly projecting and horizontally inwardly turned leg at the other end of said member, said inwardly turned leg extending beyond the center of said horizontally disposed member; a shaft fixedly mounted on said horizontally disposed member and projecting exteriorly of said oven; and means exteriorly of said oven for rotating said shaft for effecting an agitation by said horizontally disposed member and downwardly projecting legs of the contents of said oven.

2. A roasting machine comprising a casing; a base on said casing; a standard attached to said base for supporting said casing; a hopper mounted on said base, said base having an opening communicating with said hopper, said hopper being downwardly inclined toward and projecting outwardly from one side of said casing; an oven mounted in said casing and spaced from the inner sides thereof; material nonconducting as to heat positioned in the space between said oven and said casing; an agitator rotatably mounted in said oven; a shaft connected with said agitator and projecting exteriorly of said oven; a gear mounted on its outer end of said shaft; means for rotating said gear, said casing having an opening in its upper side communicating with said oven; a closure for said opening; said oven having an opening formed in its bottom communicating with said hopper through said opening in said base; and a closure for said opening in said bottom.

3. A roasting machine comprising: a casing; a base on said casing; a hopper mounted on and depending from said base, said base having an opening communicating with said hopper, said hopper being downwardly inclined toward and projecting outwardly from one side of said casing; an oven mounted in said casing; an agitator rotatably mounted in said oven; means for rotating said agitator, said casing having an opening in its upper side communicating with said oven; a closure for said opening, said oven having an opening formed in its bottom communicating with said hopper through said opening in said base; and a closure for said opening in said bottom.

4. A roasting machine comprising: a casing; a base on said casing; a hopper mounted on and depending from said base, said base having an opening communicating with said hopper, said hopper being downwardly inclined toward and projecting outwardly from one side of said casing, there being an opening formed in the upper surface of said outwardly projecting portion of said hopper; a closure for said opening; an oven mounted in said casing, said casing having an opening in its upper side communicating with said oven; a closure for said opening in said upper side of said casing, said oven having an opening formed in its bottom communicating with said hopper through said opening in said base; a closure for said opening in said base; a cover for said opening in said outwardly projecting portion of said hopper; and a heating element for heating the contents of said oven.

In testimony whereof I have signed the foregoing.

AXEL E. FREDRICKSON.